United States Patent [19]

Musch

[11] Patent Number: 4,704,441

[45] Date of Patent: Nov. 3, 1987

[54] PROCESS FOR THE POLYMERIZATION OF CHLOROPRENE

[75] Inventor: Rüdiger Musch, Bergisch-Gladbach, Fed. Rep. of Germany

[73] Assignee: Bayer Aktiengesellschaft, Leverkusen, Fed. Rep. of Germany

[21] Appl. No.: 558,814

[22] Filed: Dec. 7, 1983

[30] Foreign Application Priority Data

Dec. 17, 1982 [DE] Fed. Rep. of Germany ....... 3246748
Dec. 17, 1982 [DE] Fed. Rep. of Germany ....... 3246749

[51] Int. Cl.$^4$ ............................................. C08F 2/22
[52] U.S. Cl. ................................. 526/220; 526/295
[58] Field of Search ............................. 526/220, 295

[56] References Cited

U.S. PATENT DOCUMENTS

| | | | |
|---|---|---|---|
| 3,397,173 | 8/1968 | Collette et al. ...................... | 524/349 |
| 4,101,481 | 7/1978 | Branlard ............................... | 526/220 |
| 4,255,539 | 3/1981 | Branlard ............................... | 528/389 |
| 4,339,372 | 7/1982 | Branlard ............................... | 526/220 |

FOREIGN PATENT DOCUMENTS

| | | |
|---|---|---|
| 0011029 | 5/1980 | European Pat. Off. . |
| 2645920 | 4/1978 | Fed. Rep. of Germany . |
| 1271405 | 6/1978 | Fed. Rep. of Germany . |
| 122812 | 9/1981 | Japan .................................. 526/220 |
| 1051349 | 12/1966 | United Kingdom . |
| 1064266 | 4/1967 | United Kingdom . |
| 1433006 | 4/1976 | United Kingdom . |

*Primary Examiner*—Christopher Henderson
*Attorney, Agent, or Firm*—Connolly and Hutz

[57] ABSTRACT

Polychloroprene, optionally modified with sulphur, is obtained having improved properties and light in color if, in the course of polymerization, from $1.5 \times 10^{-2}$ to $4 \times 10^{-4}$ mol of a tetraalkyl thiuramic disulphide per 100 g of monomer are added when from 56 to 74% of the monomer has been converted, and polymerization is then continued for a further conversion of from 3 to 10%.

7 Claims, No Drawings

PROCESS FOR THE POLYMERIZATION OF CHLOROPRENE

This invention relates to a process for the production of polychloroprene in the presence of tetraalkyl Thiuramic disulphides.

Chloroprene unipolymers and copolymers are versatile in use, for example as raw materials for adhesives or as elastomers.

The chloroprenes used as raw materials for adhesives are preferably unipolymers, which are used in the form of solutions in organic solvents, for example for bonding leather, rubber, plastics, wood and metal. In most cases, they contain auxiliary substances and additives, such as terpene resins or modified terpene/phenol resins.

Both chloroprene unipolymers and chloroprene copolymers are used as elastomers. They have good resistance to oils, solvents and fats and high flame resistance.

Among the chloroprene copolymers, those which are modified with sulphur are particularly important by virtue of the valuable properties thereof which make them suitable for a wide range of applications. The excellent capacity thereof for mastication and the capacity thereof for vulcanization without the addition of thiourea accelerators must be regarded as particularly valuable properties which makes these particular polymers the preferred materials for the production of articles which are required to withstand high dynamic loads, such as cone belts and compressed air bellows.

The production of chloroprene unipolymers and copolymers in the presence of emulsifiers and activators in aqueous alkaline emulsions is known (see Houben Weyl, Methoden der organischen Chemie, Thieme Verlag Stuttgart, volume XIV/1, Makromolekulare Stoffe, Page 101 et seq).

Important auxiliary substances for the production of chloroprene polymers are the tetraalkyl thiuramic disulphides. They are used as polymerisation stoppers, they improve the storage stability of adhesives and they serve as peptising agents for sulphur-modified polychloroprenes.

For these purposes, the tetraalkyl thiuramic disulphides are normally added after polymerisation has been completed and before the after-treatment, such as peptisation or working-up, but working-up of the polychloroprene latices, e.g. by freezing coagulation and drying to form the solid rubber, is in that case highly unsatisfactory for ecological and economic reasons.

The addition of a tetraalkyl thiuramic disulphide dispersion to the polychloroprene latex causes fluctuations in the product properties due to the uneven distribution of the dispersion in the latex, e.g. it may cause an undesirable reduction in the flocculation stability of the finished adhesive solution in storage.

If tetraethyl thiuramic disulphide is added at the beginning, e.g. as molecular weight regulator in the aqueous emulsion polymerisation of chloroprene with sulphur, then a substantially larger quantity of activator is used up for achieving a certain degree of conversion than in the absence of this product. (German Offenlegungsschrift No. 2,645,920, page 4). The use of a selected emulsifier system and the additional use of secondary and/or tertiary aliphatic amines is proposed for solving this problem.

The addition of amine, which is in itself not desirable, causes excessively rapid curing of the rubber and considerable discoloration.

If tetraethyl thiuramic disulphide is added at the beginning of the reaction for the production of sulphur-modified polychloroprenes, it results in poor storage stability which manifests itself in a rise in viscosity during several weeks storage (German Auslegeschrift No. 1,271,405, Example 2 B).

It is an object of the present invention to employ tetraalkyl thiuramic disulphides in such a manner that the above-mentioned disadvantages are avoided and improved products are obtained economically.

It is surprisingly found that this problem is solved by adding the tetraalkyl thiuramic disulphide within a certain range of monomer conversion during the reaction.

In the case of adhesives, storage stable products are obtained which show much less fluctuation in product properties and have a distinctly lighter colour.

In the case of sulphur-modified polychloroprenes, the product obtained is light in colour with very good curing characteristics and good ageing characteristics, e.g. a low compression set and advantageous mechanical properties of the vulcanizates after ageing. The addition of amines may be omitted.

The present invention therefore relates to a process for the production of polychloroprene by the polymerisation of chloroprene, optionally sulphur and optionally one or more other monomers capable of copolymerising with chloroprene, with the addition of tetraalkyl thiuramic disulphide at temperatures of from 5° to 50° C. in an alkaline, aqueous emulsion, characterised in that from $1.5 \times 10^{-2}$ to $4 \times 10^{-4}$ mol of tetraalkyl thiuramic disulphide, based on 100 g of all the monomers, are added when the monomer conversion is from 56 to 74% and polymerisation is then continued for a further from 3 to 10%.

In the process according to the present invention, the more advantageous properties are obtained particularly if the thiuramic disulphide is added in the form of a solution in organic solvents, a solution in chloroprene being particularly advantageous. The monomer conversion rate at which the solution is added depends upon the reaction temperature. It has been found advantageous to add the thiuramic disulphide solution at a monomer conversion of from 58 to 64% when the reaction temperature is 45° C., at a monomer conversion of from 62 to 68% when the reaction temperature is 25° C. and at a monomer conversion of from 66 to 72% when the reaction temperature is 10° C. The general rule applies that the higher the reaction temperature, the earlier is the stage at which the thiuramic disulphide should be added.

Examples of suitable comonomers, particularly for sulphur-modified polychloroprene, include styrene, acrylo nitrile, 1-chlorobutadiene and 2,3-dichlorobutadiene, which may be added in total quantities of up to 10%, by weight, based on the total quantity of monomers.

When preparing a sulphur-modified polychloroprene, for example, from 0.4 to 0.7 g of sulphur, based on 100 g of monomers is introduced into the polymerisation reaction.

Polymerisation may be carried out continuously or batch-wise, the continuous method being preferred. A cascade of stirrer vessels may be used in that case, the tetraalkyl thiuramic disulphide solution being introduced into the last vessel.

The polymerisation is carried out by known methods, those described in German Offenlegungsschrift Nos.

3,002,711; 3,002,734 and 2,650,714 being particularly suitable.

One particularly suitable tetraalkyl thiuramic disulphide is tetraethyl thiuramic disulphide (TETD), generally added as from 5 to 50% by weight solution.

The latex may be worked-up, for example by freezing coagulation, using the method described in German Offenlegungsschrift No. 2,645,921.

In Examples 1 to 11, a solution of 10 g of potassium persulphate and 0.2 g of sodium-$\beta$-antraquinone sulphonate in 490 g of water is used as catalyst.

EXAMPLE 1

Production of polyxer latex I (Comparison Example)

970 g of 2-chloroprene and 30 g of 2,3-dichlorobutadiene are emulsified in 1,500 g of water to which 55 g of a 70% by weight disproportionated resinic acid, 5 g of the sodium salt of a naphthalene sulphonic acid/formaldehyde condensation product, 5 g of sodium hydroxide, 3 g of anhydrous sodium pyrophosphate, 5 g of triisopropanolamine and 12 g of sulphur dispersion (50% by weight) have been added.

The emulsion is purged with nitrogen, heated to 50° C. and started by the addition of catalyst solution. Further catalyst solution is added during polymerisation at such a rate that the temperature of the reaction mixture does not rise above 50° C. After a monomer conversion of 65%, polymerisation is stopped with 1 g of phenothiazine and the excess monomer is removed by steam distillation under reduced pressure. A latex having a solids content of from 26.5 to 27.0%, by weight, is obtained. 18 ml of the catalyst solution were used up.

EXAMPLE 2

Production of polymer latex II (Comparison Example )

The procedure is the same as in Example 1, but 3.0 g of TETD are added to the reaction mixture before the reaction begins.

To obtain a monomer conversion of 65%, 46 ml of catalyst solution were required to activate the reaction.

EXAMPLE 3

Production of polymer latex III (Example according to the present invention)

The procedure is the same as in Example 1, but, in addition, 10 g and 20 g, respectively, of TETD (IIIa and IIIb, respectively) dissolved in 20 g and 40 g, respectively, of chloroprene are introduced into the reaction vessel at a monomer conversion of 61% and polymerisation is then continued to a monomer conversion of 66%. Subsequent working-up is carried out as in Example 1. The catalyst consumption was 17 m.

EXAMPLES 4 to 8

Storage Stability

Latices I to III are peptised for 4 hours at 45° C. with various quantities of TETD and n-dibutylamine, and the samples are worked-up with the addition of TETD as stabilizer. The Mooney Viscosity of the polymer samples are determined according to DIN 53 523. To determine the viscosity, the samples are stored for 3 days at 70° C. The viscosity is then again determined. The more stable the products, the smaller is the viscosity difference (Δ ML) between the measurements.

| Example | 4(*) | 5(*) | 6(*) | 7 | 8 |
|---|---|---|---|---|---|
| Latex | I | IIa | IIb | IIIa | IIIb |
| TETD as solution (g) | 0 | 3.0() | 3.0() | 10 | 20 |
| TETD as dispersion (g) | 15 | 0 | 0 | 12 | 0 |
| n-dibutylamine (g) | 0.5 | 0 | 0 | 0.5 | 0 |
| subsequent addition of TETD (g) (dispersion) | 10 | 17 | 22 | 0 | 0 |
| Total TETD (Quantity in the reaction mixture, g) | 25 | 20 | 25 | 22 | 20 |
| ML-4 (ME) | 50 | 50 | 48 | 49 | 52 |
| ML-4 (ME, 3 days 70° C.) | 46 | 67 | 61 | 47 | 49 |
| ΔML | −4 | +17 | +13 | −2 | −3 |

(*)Comparison example
(**)At onset of the reaction

EXAMPLE 9

Polymer colour

The polymer latices prepared according to Examples 4, 7 and 8 are frozen on a cooling roll and dried. The rubber prepared according to the present invention thereafter has a lighter natural colour. To assess the colour, the polymers were dissolved in toluene (20%, by weight), films 1 mm in thickness were cast from this solution and, when the films had been dried, the colour thereof was compared with those of pattern cards RAL (Ausschusses für Lieferbedingungen und Gütesicherung beim Deutschen Normenausschuss (DNA), 6 Frankfurt/M. 1 Gutleutstr. 163-167).

| Polymer from Example | Polymer colour according to RAL |
|---|---|
| 4(*) | 1024 |
| 7 | 1002 |
| 8 | 1001 |

(*)Comparison Example.

The Table clearly shows that the present invention enables a rubber having a substantially lighter colour to be obtained (Example 4).

EXAMPLE 10

Compression set (C.S.)

The compression set or pressure deformation residue is determined according to DIN 53 517. This test serves to determine the behaviour of elastomers under constant deformation and indicates what proportion of the deformation of a test sample has remained at a given point in time after the release of pressure, based on the compression. The values are determined on a vulcanizate prepared from a polymer/carbon black mixture according to ISO standard 2 475 and cured at 150° C. The compression set should be as low as possible.

| Polymer from Example | 4(*) | 7 |
|---|---|---|
| CS, 22 hours at 70° C. (%) | 19.4 | 14.9 |
| CS, 70 hours at 100° C. (%) | 78 | 67 |

(*)Companion Example

EXAMPLE 11

Response of the vulcanizates to ageing

The polymer test mixture is prepared according to ISO standard 2 475 and cured in three stages at 150° C. (20, 40 and 60 minutes). The strength and elongation are determined according to DIN 53 455 and the loss in strength and in elongation after hot air ageing for 7 days at 120° C. are also determined.

| Polymer from Example | 7 | 4(*) |
|---|---|---|
| Strength (MPa) (Unaged) | 20.0 | 20.5 |
| Strength (MPa) (7 days 120° C.) | 16.1 | 14.2 |
| Decrease in % | 19.5 | 30.7 |
| Elongation, unaged (%) | 555 | 555 |
| Elongation (7 days 120° C.) (%) | 240 | 200 |
| Decrease (%) | 57 | 64 |

(*)Comparison Example

Examples 10 and 11 show that the vulcanizate of the polymer of Example 7 according to the present invention has a substantially improved compression set and more advantageous response to ageing than that of comparison Example 4.

EXAMPLE 12

Production of polymer latex IV (Comparison Example)

1,000 g of polychloroprene are emulsified in 1,500 g of water to which 55 g of disproportionated resinic acid (solids content 70%), 5 g of the sodium salt of a naphthalene sulphonic acid/formaldehyde condensation product, 6 g of sodium hydroxide and 1.26 g of n-dodecyl-mercaptan have been added. A 3% by weight aqueous formamidine sulphinic acid solution is used as catalyst.

The emulsion is purged with nitrogen, heated to 50° C. and started by the addition of catalyst solution. Further catalyst solution is added in the course of polymerisation at such a rate that the temperature of the reaction mixture does not rise above 45° C. After a monomer conversion of 65%, the reaction is stopped with 1 g of phenothiazine and the excess monomer is separated off by steam distillation under reduced pressure.

34 g of a 30% by weight aqueous dispersion of TETD are added to the latex, the pH is reduced to 6.0 and the polymer is frozen on a cooling roll and dried. The Mooney viscosity (ML-4') of the polymer is 108 ME.

EXAMPLE 13

Production of polymer latex V (Comparison Example)

An emulsion is prepared according to Example 12 and 0.8 g of potassium persulphate and 0.05 g of sodium anthraquinone-2-sulphonate are added as activator. The reaction starts at a reaction temperature of 15° C. The temperature of the reaction mixture is lowered to 10° C. by external cooling and a 3% by weight formamidine sulphinic acid solution is added at such a rate that the reaction temperature does not rise above 12° C. After a monomer conversion of 80%, the reaction is stopped as described in Example 12 and the product is worked-up after the addition of 42 g of the TETD dispersion. The Mooney Viscosity (ML-4') of the polymer is 95 ME.

EXAMPLE 14

Production of polymer latex VI (Example according to the present invention)

The procedure is the same as in Example 12, except that 5 g of TETD dissolved in 25 g of chloroprene are introduced into the reaction vessel at a monomer conversion of 62% and polymerisation is then continued to a monomer conversion of 66%. Subsequent working-up is carried out as in Example 12, but without the subsequent addition of TETD. A polymer having a Mooney Viscosity (ML-4') of 104 ME is obtained.

EXAMPLE 15

Production of polymer latex VII (Example according to the present invention)

The procedure is the same as in Example 13, except that 6.4 g of TETD dissolved in 25 g of chloroprene are introduced into the reaction vessel at a monomer conversion of 72% and polymerisation is then continued to a monomer conversion of 79%. Subsequent working-up without further addition of TETD is carried out as in Example 13. A polymer having a Mooney viscosity (ML-4') of 92 ME is obtained.

EXAMPLE 16

(Polymer colour)

The polymers dried according to Examples 12 to 15 are dissolved in toluene (20%, by weight). Films 1 mm in thickness are cast from this solution. The colour of these films is then compared with pattern cards RAL (Ausschusses für Lieferbedingungen und Gütesicherung beim Deutschen Normenausschuss (DNA); 6000 Frankfurt/Main, 1 Guteleutstrasse 163–167) after drying.

| Polymer from Example | Polymer colour according TO RAL |
|---|---|
| 12(*) | 1015 light ivory |
| 14 | 9001 cream white |
| 13(*) | 1014 Ivory |
| 15 | 9001 cream white |

(*)Comparison Example

It is clear from the Table that the adhesive obtained according to the present invention is substantially lighter in colour.

EXAMPLE 17

(Storage stability)

The spreadability and ease of working-up adhesive solutions, particularly with mechanical devices, depend to a large extent upon the viscosity of the adhesive. The viscosity of the adhesive is required to remain substantially constant during its storage in order to ensure uniform ease of working-up and strength of the adhesive bond. These characteristics may suitably be tested by determining the viscosity stability and the normal stress ratio (NZ) of the adhesive solution.

A: Preparation of the adhesive solution:

33 g of polymer are dissolved with stirring in 117 g of a solvent mixture consisting of ethyl acetate/65°–95° C. petroleum hydrocarbons and toluene in proportions, by weight, of 2:2:1 in a 250 g, wide necked flask with screw top. The polymer is cut up into pieces of about 5 mm in diameter and dissolved by rotating the closed flask at the rate of 300 revolutions per minute for 16 hours.

B: Determination of the viscosity of adhesives using a rotation viscosimeter according to Brookfield:

After the the solution has been prepared, the viscosity is adjusted to 10 Pa.s at 23° C. by means of the Brookfield viscosimeter LVT by further addition of the solvent mixture used, and the solution is observed over a period of 6 months. The measurements are based on DIN 53 019, draft of January 1979.

Determination of the visco-elasticity of the solution according to Method B is carried out after various storage times at a storage temperature of 23° C.

The results obtained should remain constant as far as possible. Pronounced deviations in either direction are not desired.

The measurements are carried out on adhesive raw materials prepared with various TETD contents according to Examples 13 to 15.

| Polymer from Example | 13(*) | 13(*) | 15(++) | 15 | 14 |
|---|---|---|---|---|---|
| TETD dispersion (solids, g) | 15.6 | 7.9 | | | |
| TETD solution (solids, g) | — | — | 15.6 | 7.9 | 7.9 |
| Viscosity (Pa.s) | | | | | |
| 0 days | 10 | 10 | 10 | 10 | 10 |
| 14 days | 12 | 14 | 9 | 10 | 10 |
| 1 month | 15 | 18 | 7 | 10 | 10 |
| 3 months | 18 | 24 | 6 | 10 | 10 |
| 6 months | 22 | 30 | 4 | 9 | 11 |

(*)Comparison Example
(++)Comparison Example because of unclaimed TETD-amount

I claim:

1. Process for the production of polychloroprene by the polymerisation of chloroprene, with or without sulphur and one or more other monomers which are copolymerisable with chloroprene, with the addition of tetraalkyl thiuramic disulphide in an alkaline aqueous emulsion at temperatures of from 5° to 50° C. comprising adding from $1.5 \times 10^{-2}$ to $4 \times 10^{-4}$ mol of tetraalkyl thiuramic disulphide per 100 g of the total monomer content during the course of polymerisation when the monomer conversion is from 56 to 74%, and continuing polymerisation thereafter by a further 3 to 10%.

2. Process according to claim 1, comprising adding tetraalkyl thiuramic disulphide in the form of a solution in an organic solvent.

3. Process according to claim 2, comprising chloroprene as the organic solvent.

4. Process according to claim 1, comprising tetraethyl thiuramic disulphide as the tetraalkyl thiuramic disulphide.

5. Process according to claim 1, comprising adding from 0.4 to 0.7%, by weight, of sulphur, based on the monomer, for the production of a sulphur-modified polychloroprene.

6. Process according to claim 1, comprising adding styrene, acrylonitrile, 1-chlorobutadiene and 2,3-dichlorobutadiene as comonomers in total quantities of up to 10%, by weight, based on the total monomer.

7. Process for the production of polychloroprene by the polymerization of chloroprene, with or without sulphur and one or more other monomers which are copolymerizable with chloroprene, with the addition of tetraalkyl thiuramic disulphide in an alkaline aqueous emulsion at temperatures of from 5° to 50° C. comprising adding from $1.5 \times 10^{-2}$ to $4 \times 10^{-4}$ mol of tetraalkyl thiuramic disulphide per 100 g of the total monomer content during the course of polymerization when the monomer conversion is from 56 to 74%, and continuing polymerization thereafter by a further 3 to 10% and with the proviso that the higher the reaction temperature, the earlier tetraalkyl thiuramic disulphide is added.

* * * * *